June 5, 1934.  T. V. BUCKWALTER  1,961,134
ANTIFRICTION BEARING
Filed Sept. 6, 1932
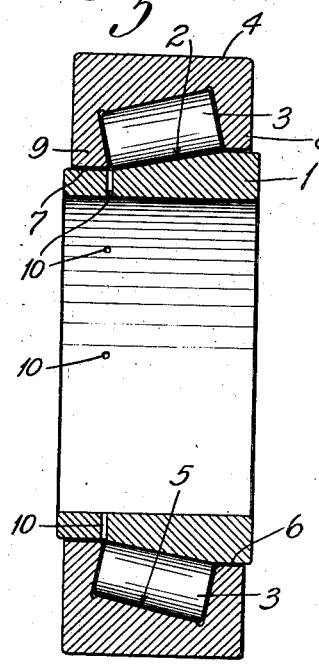
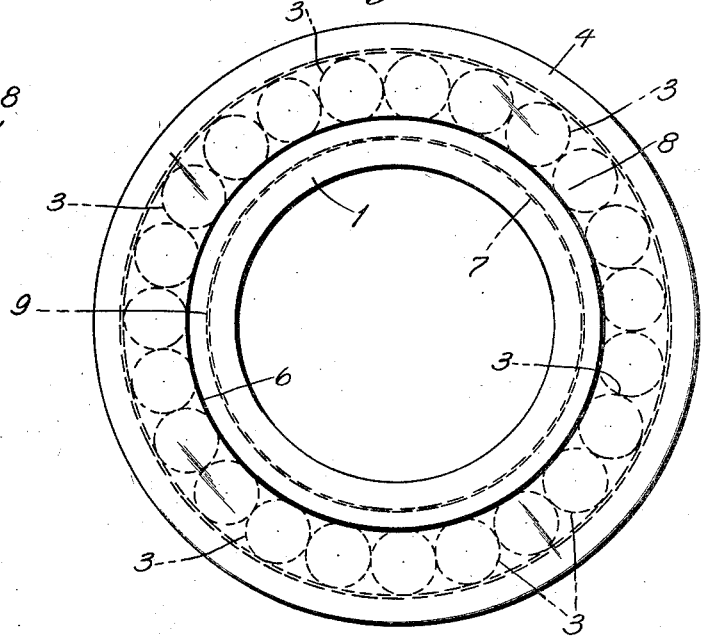
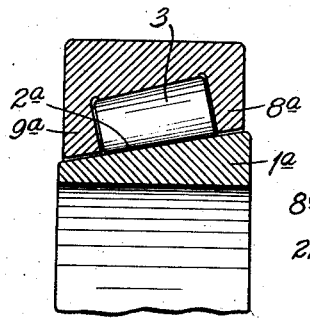
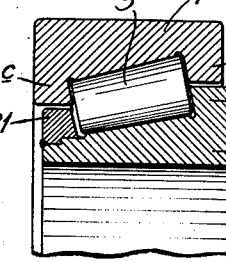
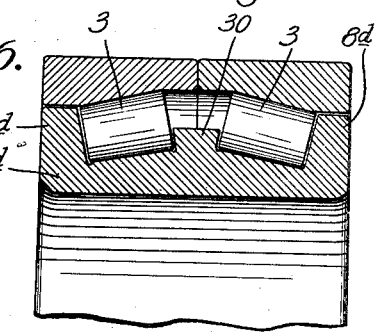
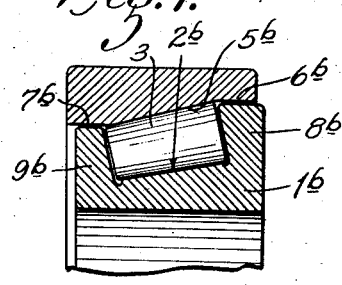
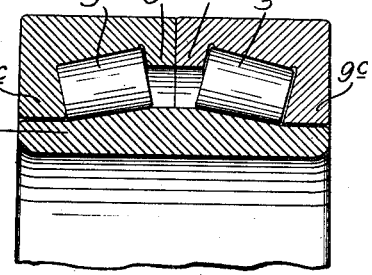
INVENTOR:
Tracy V. Buckwalter,
by Carlton Gravely
HIS ATTORNEYS Patented June 5, 1934

1,961,134

UNITED STATES PATENT OFFICE 1,961,134

ANTIFRICTION BEARING

Tracy V. Buckwalter, Canton, Ohio, assignor to The Timken Roller Bearing Company, Canton, Ohio, a corporation of Ohio Application September 6, 1932, Serial No. 631,791

10 Claims. (Cl. 308—214)

My invention relates to antifriction bearings, particularly to bearings subjected to shock load and to very heavy load. It has for its principal object a bearing that will have a long life and will operate satisfactorily under such loads. Other objects are to provide for proper lubrication of such bearings and to make the bearings self-contained and to obtain other advantages hereinafter set forth.

The invention consists principally in a conical roller bearing wherein one bearing member is provided with ribs at each end thereof that closely confine the bearing rollers and that fit over the other bearing members with only a very slight clearance therebetween. The invention further consists in the antifriction bearing and in the parts and combinations and arrangements of parts hereinafter described and claimed.

In the accompanying drawing, wherein like reference characters indicate like parts wherever they occur:

Fig. 1 is a sectional view of a bearing embodying my invention;

Fig. 2 is an end view thereof; and

Figs. 3, 4, 5, 6 and 7 are partial sectional views of modified forms of the invention.

In Fig. 1 is illustrated a cone 1 or inner bearing member provided with a conical raceway portion 2 on which are mounted conical rollers 3 and a cup 4 or outer bearing member having a conical raceway portion 5 for said bearing rollers. Said inner bearing member 1 has a cylindrical portion 6 extending beyond the large end of the raceway and a cylindrical portion 7 extending beyond the small end of the raceway. Adjacent to the large end of the raceway, the cup 4 is provided with an annular flange or thrust rib 8 and at the small end with an annular flange or rib 9, the conical bearing rollers 3 being closely confined between said ribs. The usual cage is disposed with and a full circular series of rollers is used, a proper running fit being provided for said rollers.

Only a slight clearance, say .001 of an inch is provided between the ribs 8 and 9 and the cylindrical portions 6 and 7 respectively of the bearing cone 1; so that when the rollers are flattened under very heavy loads or shocks, said ribs will come into contact with said cylindrical portions, thus producing a plain bearing that cooperates with the roller bearing.

In order to make the bearings self-contained, the diameter of the cylindrical portion 7 of the cone may be made slightly greater, say one-half thousandth (.0005) inch, than the inside diameter of the circle of the smaller ends of the assembled rollers, when said rollers are held in the raceway of the bearing cup. The metal can compress and the rollers yield sufficiently to permit said cylindrical portion 7 to be snapped past the small ends of the rollers 3. The bearing will remain assembled in ordinary handling, a direct axial pressure of considerable amount being required to disassemble the bearing.

The cone 1 is provided with a plurality of passageways 10 extending from the in'erior to the bearing surface thereof, the openings of said passageways being adjacent to the path of travel of the small ends of the rollers 3. Thus, if said passageways 10 are supplied with oil as by passageways in the member on which the cone is mounted, they will feed oil to the small ends of the rollers and the pumping action of the rollers will result in complete lubrication of the bearing.

In Fig. 3 is illustrated a cone 1a or inner bearing member quite similar in construction to that of Fig. 1, but having the end portions thereof continuations of the conical raceway portion 2a. The ribs 8a and 9a have conical inner peripheries to conform to said conical surface.

In the construc ion shown in Fig. 4, the cone 1b has a thrust rib 8b at the large end of its raceway portion 2b and a rib 9b at its small end, said ribs having cylindrical outer peripheries. The cup has a conical raceway portion 5b, a cylindrical portion 6b at the large end thereof, and a cylindrical por ion 7b at the small end thereof, said cylindrical portions fitting on the ribs with only a slight clearance.

To make the construction of Fig. 4 self-contained, the diameter of the cylindrical surface 6b may be made slightly smaller than the diame'er of the circle formed by the large ends of the rollers when mounted on the cone.

In the construction shown in Fig. 5, the cup 4c has a thrust rib 8c at its large end and a rib 9c at its small end, said ribs extending about to the axial line of the rollers. The cone 1c likewise has an interior rib 20 at its large end and a separate rib 21 at its small end. The separate rib 21 is put in place after the bearing has been assembled. In this construction the height of all the ribs is such that there is only a slight clearance between cooperating ribs.

Figs. 6 and 7 show the adaptability of the invention to multiple series bearings. In Fig. 6, the cone 1d is double and is provided with full size ribs 8d at its outer ends, the rollers 3 being disposed with their small ends outward. At the middle, the cone is provided with a thrust rib 30 which need not be full height. The diameter of the cylindrical portions 6d of the cups at the large ends of the rollers is slightly less than the diameter of the circle of the large ends of the rollers 3, thus making the entire bearing self-contained.

In Fig. 7, the double cone 1c has no ribs, the cups have ribs 9c at the small ends of the rollers and thrust ribs 8c for the large ends of the rollers. This bearing also is self-contained.

The close fit between the bearing members at the ends of rollers enables the bearing rollers to act as plain bearings, thus accommodating heavy load and shock. Efficient lubrication of the bearing is provided and the bearing members themselves seal the ends of the bearing, thus avoiding the necessity for special closure members. The bearing may be made self-contained, thus facilitating handling thereof and eliminating expensive retaining devices.

Obviously, numerous changes may be made without departing from the invention and I do not wish to be limited to the precise construction shown and described.

What I claim is:

1. A conical roller bearing comprising an inner bearing cone tapering from end to end of its outer surface, conical bearing rollers thereon and a bearing cup for said rollers, said bearing cup having inwardly extending annular ribs closely confining the ends of the rollers thereby preventing endwise movement of the rollers, the inner peripheries of said ribs tapering and closely fitting the conical surface of said cone so as to be capable of forming a plain bearing therewith.

2. A conical roller bearing comprising an inner bearing cone tapering from end to end of its outer surface, conical bearing rollers thereon and a bearing cup for said rollers, said bearing cup having inwardly extending annular ribs closely confining the ends of the rollers, the inner peripheries of said ribs tapering and closely fitting the conical surface of said cone and said cone having lubricant passageways therethrough terminating adjacent to the small ends of the rollers.

3. A conical roller bearing comprising an inner bearing cone, an outer bearing cup and conical rollers therebetween, one of said bearing members having cylindrical portions at each end and the other bearing member having ribs with outer peripheries closely fitting said cylindrical portions, the diameter of one of said cylindrical portions being slightly different from that of the circle formed by the ends of the rollers over which said cylindrical portion moves in assembling whereby force is required to seat said bearing member and the bearing is self-contained.

4. A conical roller bearing comprising an inner bearing cone having a conical raceway and cylindrical portions at each end thereof, conical rollers on said raceway and a conical bearing cup having ribs fitting closely on said cylindrical portions of said cone, the diameter of the cylindrical surface at the small end of said cone being slightly larger than the diameter of the circle formed by the small ends of the assembled rollers, thereby making the bearing self-contained.

5. A conical roller bearing comprising an inner bearing cone having a conical raceway and ribs at the ends thereof, conical rollers and an outer bearing cup having cylindrical portions fitting closely on the peripheries of said ribs, the cylindrical portion at the large end of said cup being slightly less in diameter than the circle formed by the large ends of the rollers whereby force is required to assemble the bearing and the bearing is self-contained.

6. A double row taper roller bearing comprising inner and outer bearing members and two series of conical rollers therebetween arranged with their large ends towards the middle of the bearing, one of said bearing members being of one piece construction, one of said bearing members having wide ribs at its outer ends disposed in close juxtaposition to the small ends of said rollers and with their peripheries closely fitting portions of the other bearing member, and one of said bearing members having a low central thrust rib for the large ends of said rollers.

7. A double row taper roller bearing comprising inner and outer bearing members and two series of conical rollers therebetween arranged with their large ends towards the middle of the bearing, the inner bearing member being of one piece construction and having wide ribs at its outer ends disposed in close juxtaposition to the small ends of said rollers and with their peripheries closely fitting portions of the other bearing member, said inner bearing member also having a low central thrust rib for the large ends of said rollers.

8. A taper roller bearing comprising inner and outer bearing members and rollers therebetween, one of said bearing members having wide ribs at each end the clearance between the peripheries of said ribs and portions of the other bearing member being so slight as to enable them to form a plain bearing under deformation of said rollers, said rollers being closely confined between the faces of said ribs, whereby endwise movement of the rollers is prevented and said ribs are held from contact with said cooperating portions of the other bearing member during normal operation of the bearing.

9. A taper roller bearing comprising inner and outer bearing members and rollers therebetween, one of said bearing members having wide ribs at each end the clearance between the peripheries of said ribs and portions of the other bearing member being so slight as to enable them to form a plain bearing under deformation of said rollers, said rollers being closely confined between the faces of said ribs, whereby endwise movement of the rollers is prevented and said ribs are held from contact with said cooperating portions of the other bearing member during normal operation of the bearing, said inner bearing member having lubricant passageways terminating adjacent to the small ends of the rollers.

10. A taper roller bearing comprising inner and outer bearing members and rollers therebetween, one of said bearing members having wide ribs at each end the clearance between the peripheries of said ribs and portions of the other bearing member being so slight as to enable them to form a plain bearing under deformation of said rollers, said rollers being closely confined between the faces of said ribs, whereby endwise movement of the rollers is prevented and said ribs are held from contact with said cooperating portions of the other bearing member during normal operation of the bearing, the peripheries of said ribs and the cooperating portions of said other bearing member being conical.

TRACY V. BUCKWALTER.